United States Patent Office 2,767,185
Patented Oct. 16, 1956

2,767,185

METHOD FOR THE PREPARATION OF AMINO CYCLANOLS AND PRODUCTS

Richard Baltzly, Tuckahoe, Emil Lorz, Yonkers, and Peter Byrom Russell, Crestwood, N. Y., assignors to Burroughs Wellcome & Co. (U. S. A.) Inc., Tuckahoe, N. Y., a corporation of New York No Drawing. Application February 11, 1954, Serial No. 409,764

11 Claims. (Cl. 260—268)

The subject of the present invention is a method of preparing a family of compounds represented by Formula 1

(1)

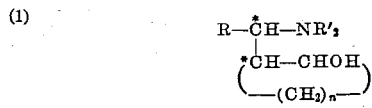

wherein $n$ is an integer from 3 to 5, R is a phenyl radical and NR′₂ is a secondary amino group selected from the class consisting of the methylalkylamino and methylaralkylamino radicals, piperidino, morpholino, pyrrolidino and N′-alkylpiperazino radicals.

In this method a secondary amine which may be a methyl secondary amine or one of the cyclic secondary amines listed above is added to a benzalcyclanone. The general reaction is as shown:

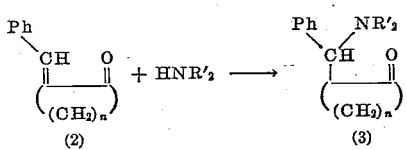

These products are β-amino ketones and as such are rather unstable. Certain of them, e. g. those obtained from piperidine and N′-methylpiperazine with benzalcyclohexanone and from N′-methylpiperazine with benzalcycloheptanone are crystalline solids which can be recrystallized from ether-hexane mixture or, if one works rapidly, from methanol. In alcohols, however, if they are allowed to stand more than a few hours, the compounds redissolve and can no longer be recovered. Presumably this is because the reaction of formation is reversible and the benzalcyclohexanone can also add the elements of an alcohol.

For these reasons alcoholic solvents are to be avoided in working with these compounds. In the preparation a small amount of ether or of another indifferent solvent may be employed but too much solvent is in any case to be avoided. If the aminoketone does not crystallize readily it is inadvisable to attempt its isolation but rather we prefer to proceed with the total reaction mixture to the next step which consists of a reduction whereby the stable amino alcohol product is obtained. The preferred reducing agents are metal hydrides especially the complex hydrides of alkali metals and metals of the third group of the periodic table such as sodium borohydride and lithium aluminum hydride. Of these the last is exemplary in its effect, reduction being rapid and essentially quantitative. Hence, in cases, wherein no crystalline aminoketone had been obtained, we consider that the yield of amino-alcohol is a measure of the formation of the aminoketone also.

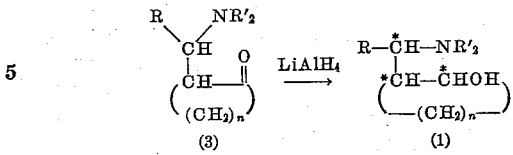

On the basis of these principles we have investigated the addition of a variety of amines and have found that only certain types are effective for this purpose. The best yields have been obtained with piperidine and methylpiperazine which afford 80 to 85% yields of pure crystalline amino ketone wherefrom the reduction step appears to be quantitative. N′-ethyl-piperazine and pyrrolidine give aminoketones that do not crystallize so readily but which afford good yields of amino-alcohols. With morpholine, dimethylamine and benzylmethylamine yields are less good but still useful. On the other hand, diethylamine, 1,2,5-trimethylpiperazine and 2-methylpiperidine give little or no product. Consequently, it appears that the steric character of the amine is rather vital in this reaction. Examination of models shows that such compounds as benzylcyclohexanone are rather highly hindered and this is doubtless the reason for the extreme sensitivity of this reaction to the steric factor.

The yields afforded by benzalcyclopentanone and benzal cycloheptanone are inferior to those from benzalcyclohexanone but are still useful since the final products to be obtained are still less accessible by alternative routes.

It is an interesting characteristic of these additions of secondary amines to benzalcyclanones that color usually appears in the reaction in inverse relationship to the yield of aminoketone. This is believed to be due to reverse-de-aldolization of the unsaturated ketone when addition does not proceed rapidly, followed by recondensation of the liberated parts to higher molecular materials. Regardless of the yield, however, color is removed from the final amino-alcohols without difficulty.

In the over-all operation, the amine in very slight excess and the benzalcyclanone are mixed at room temperature or with gentle warming to ensure solution. No solvent may be used or a small amount of ether or the like, but in any case, the concentration should be high since the addition is reversible (the use of a solvent is advisable only when the product crystallizes from it readily). After standing a few days, the total reaction mixture is dissolved in absolute ether and added to an excess of lithium aluminum hydride in ether. The solution is refluxed for a short time after the addition is completed and water is then introduced cautiously. The amount of water to be used should be barely more than that required to decompose any possible excess of reducing agent. For example, if 0.1 mole of benzalcyclanone has been reacted with 0.105 mole of secondary amine, the amount of lithium aluminum hydride required to reduce 0.1 mole of aminoketone will be .025 mole and the .005 mole extra of amine will require 0.001 mole more. On this basis we could expect 0.026 mole of reagent to be necessary. If, on the other hand, no addition had occurred, the ketone would require 0.05 mole of reagent and the amine 0.013 mole or a total of 0.06–0.07 mole. In practice we would use 0.07 mole of reagent and as much as 0.044 mole could remain in excess. We would require 8×0.044=0.362 mole of water. Eight to nine cc. of water would accordingly be added at such a rate that refluxing of ether should not be too violent. Under these conditions the precipitate of aluminum hydroxide is fairly compact and the ethereal layer can be removed from it without appreciable loss of product.

The ethereal solution now contains, besides small amounts of water-soluble inorganic material, unreacted secondary amine, neutral reduction products of the benzalcyclanone or its side-products, and the desired amino-alcohol. The ethereal layer is first washed with water until the washings are neutral. When the amine is lower molecular as piperidine, dimethylamine, pyrrolidine or an N'-alkylpiperazine it is removed by the water wash along with any lithium hydroxide present. The aqueous washings are discarded. The ethereal layer is then extracted with several successive inadequate portions of dilute acid (usually hydrochloric). If the secondary amine is a methyl higher alkyl or aralkylamine it will be extracted preferentially in the first portions of these acid extracts and if the acid extracts are basified separately, this amine is readily removed from the product.

The amino-alcohols so obtained are light-colored oils some of which crystallize spontaneously, others are preferably distilled in high vacuum as a preliminary purification.

It will be seen that Formula 1 possesses three asymmetric atoms and hence should be capable of existing in 8 optically active forms or 4 racemic modifications. Not all of these are obtained. The aminoketones (3) have two asymmetric carbon atoms one of which is α to a carbonyl group and it is probable that in the alkaline medium of the amine addition, only the more stable of the two possible racemic amino-ketones is formed. The piperidino and N' - methylpiperazinobenzylcyclohexanones, which are crystalline appear to be homogeneous and no evidence has been obtained of the presence of isomeric material. On reduction of the carbonyl group a new asymmetric center is formed and the amino-alcohols usually appear to consist of two epimeric racemic modifications which can be separated by fractional crystallization, or by the application of chromatography.

These amino-alcohols are in turn derivatives of cis and trans 2-benzylcyclanols. In certain instances the relationships have been determined. They are of considerable importance for the further employment of these compounds.

Aside from useful physiological properties of various of these amino alcohols, or their esters or other derivatives, those compounds derived from N'-alkylpiperazines (Formulae 4a and 4b) are of especial value as intermediates in the preparation of the corresponding hexahydrobenzhydryl piperazines. The quaternary salts of these latter are powerful spasmolytics and are the subject of a co-pending application. It will be evident from consideration of Formulae 4a and 4b that replacement of the hydroxyl group

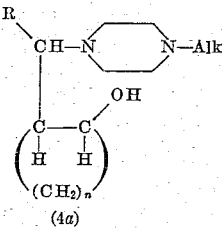
(4a)

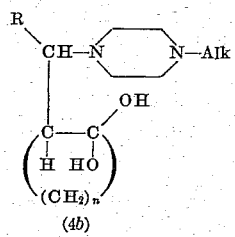
(4b)

by hydrogen will afford a hexahydrobenzhydryl piperazine while dehydration results in an α-(cyclohexenyl) benzylpiperazine whose quaternary salts are also of interest as spasmolytics.

Neither reduction nor dehydration can be accomplished directly, but rather, for both purposes the amino-alcohol is reacted with an aryl sulfonyl chloride (usually p-toluene sulfonylchloride) in pyridine. Under these conditions 4b affords the corresponding tosylate in excellent yield. This tosylate when reacted with an alkali alcoholate or a tertiary organic base such as 2,6-lutidine or collidine gives a cyclohexenyl derivation believed to be 5b and the latter may be reduced catalytically to the saturated analogue. This last is also obtained directly from the tosylate by reduction with lithium aluminum hydride.

(5b)

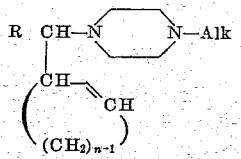

Tosylation of 4a has a different result since in this case the elimination reaction is considerably easier and takes place in the pyridine solution concurrently with tosylation. The derived cyclohexenyl compound which is believed to be 5a (and which is certainly different from that obtained from 4b) is also the parent of quaternary salts of high potency.

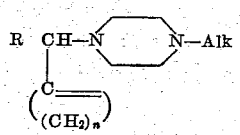

These cyclohexenyl derivatives and the methods of preparating them are the subject of a separate application.

EXAMPLE 1

(a) 2-(α-[N-piperidino] benzyl) cyclohexanone

Benzalcyclohexanone (37.2 g.) and piperidine (20 mls.) were mixed together and ether (50 ml.) added. After warming until homogeneous the mixture was set aside for five days. The amino-ketone crystallized and was filtered off (51 g.). After recrystallization from ether-ligroin or ethylacetate it melted at 124–125° C.

The ketone, with semicarbazide hydrochloride, gave a semicarbazone, M. P. 203–205° (dec.).

(b) Reduction of the above ketone with lithium aluminum hydride: cis and trans-α-(N-piperidino) benzylcyclohexan-2-ol Lithium aluminum hydride (8 g.) was stirred with ether (150 mls.) and the mixture refluxed for one hour. To this solution after cooling was added dropwise a solution of the above amino-ketone (27 g.) in ether (150 mls.), the addition took 3 to 3½ hours. After stirring overnight the excess of the mixed hydride was destroyed by the dropwise addition of water (ca. 40 mls.). The ethereal solution was separated from the aluminum hydroxide by decantation, the residue being washed several times with ether. The ethereal solution was extracted three times with 2 N hydrochloric acid (150 mls.) the acid solution basified and the precipitated oil extracted again with ether. After drying this ether extract was evaporated to give a mixture of the epimeric amino alcohols (26 g.). This oil was dissolved in hexane and on standing in the refrigerator deposited crystals (14 g.), M. P. ca. 90° (A). The mother liquors were decanted and on standing yielded a second crop (ca. 8 g.), M. P. 82–84° (B). After the removal of this crop the mother liquors were evaporated to half bulk and a further two crops collected (C) ca. 2 gm., M. P. 82–83° and (D) ca. 1.5 g., M. P. 109–110°. Crop A on recrystallization from hexane gave a crop, M. P. 110–112° (7 g.) and a second crop, M. P. 110–112° (3 g.). Fractions B and C and the mother liquors from A gave material, M. P. 82–84°. The recrystallized material from A was identical with fraction D. Further recrystallization of this material failed to raise the melting point above 111–112°. In all about 10 g. of this isomer were obtained. The compound formed fine colorless needles.

The material from A, B, and C, M. P. 82–83° was recrystallized several times without change of melting point. This compound formed small prisms; it had all the appearances of a pure compound. However, when a solution of the 83-84° isomer (2 g.) in pentane was passed through a chromatogram column of alumina the first runnings contained ca. 1.2 g. of the M. P. 111-112° form. When all of this material had passed through the column, ether was allowed to run through and this brought out a new isomer M. P. 90-91°, after several recrystallizations from pentane this material formed small needles, M. P. 92-93°.

In all about 18-20 g. of the 111° isomer were obtained and 7-9 g. of the 92-93° isomer.

EXAMPLE 2

(a) *2-(α-[N'-methyl-piperazine] benzyl) cyclohexanone*

Benzalcyclohexanone (37.2 g.) was mixed with N-methylpiperazine (20 g.) in absolute ether (20 ml.). The solution on standing at room temperature gave 47 g. (83%) of crystalline material. On recrystallization from ether-pentane it formed colorless needles, M. P. 116-117°.

(b) *Reduction of 2-(α-[N'-methyl-piperazino]benzyl)-cyclohexanone. The epimeric 2-(α-[N'-methyl-piperazino]benzyl)cyclohexanols*

Lithium aluminum hydride (ca. 8 g.) was suspended in dry ether (150 ml.) and the mixture stirred and refluxed for 1 hour. Then a solution of the above amino ketone (28.6 g.) in ether (200 ml.) was added dropwise with stirring over about two hours. The solution was then stirred at reflux overnight. After cooling the excess of the hydride was decomposed by the addition of water, the ether layer collected, extracted with 2 N HCl (3×200 ccs.) and the acid layer basified. The mixture of amino alcohols was taken into ether, the ether solution dried and evaporated to give 27 g. of basic material.

The basic material was dissolved in ether (ca. 50 mls.) and the solution allowed to stand, after some time the solution deposited crystals in the form of needles, M. P. 154° (ca. 6.5 gms.). The solvent was evaporated and replaced by pentane, several crops of crystals, M. P. 95-100° were obtained in all about 18 g. and finally a crop again melting at 150° (ca. 1 g.).

The material melting at 154° was recrystallized several times from ether, it finally melted at 157°.

The material melting at 95-100° after two recrystallizations from pentane melted at 101°.

EXAMPLE 3

(a) *2 - (α - [N - methyl - N' - piperazino]benzyl)cycloheptanone*

2-benzalcycloheptanone prepared by the condensation of benzaldehyde and cycloheptanone in alkaline solution (colorless prisms, M. P. 45°, 20 g.) and N-methylpiperazine (11 g.) in ether (ca. 15 mls.) was allowed to stand for two weeks. At the end of this time some crystalline material (ca. 3 g.) had separated. This was separated and washed well with ether. It was colorless needles, M. P. 156-157°.

(b) *2 - (α - [N' - methylpiperazino]benzyl)cycloheptanol. Reduction of 2 - (α - [N - methyl - N' - piperazine]-benzyl)cycloheptanone*

The uncrystalline material from the above reaction together with some of the crystalline (2.5 g.) and the ether washings was added to a suspension of lithium aluminum hydride (5 g.) in absolute ether (150 ml.). The mixture was stirred with refluxing for 10 hours and then the excess hydride was decomposed by water. The ethereal solution was separated and extracted with 2 N HCl several times. The original ethereal solution was then dried and evaporated to give a neutral fraction of 20 g. The hydrochloric acid solution was basified and extracted with ether. The ether solution after washing with water was dried and evaporated to give a basic fraction of 9.5 g.

The basic material crystallized slowly but almost completely to a solid, M. P. 135-138°. The solid after recrystallization from ether pentane melted at 144-145°.

It would appear that only one epimer is formed in any quantity by this reaction.

EXAMPLE 4

*Condensation of benzalcyclopentanone with N-methylpiperazine followed by reduction of the product*

(This example illustrates the general method used when the amino-ketone does not crystallize.) The ketone (43 g.) and N-methylpiperazine (25 g.) in ether (ca. 50 ml.) were allowed to stand for 20 days. The solution turned a very strong brown color but no crystals separated. The solution was then diluted with a further 50 mls. of ether and added dropwise to a suspension of lithium aluminum hydride (6 g.) in ether (250 ml.). When the addition was complete (ca. 2 hours) the mixture was stirred and refluxed for 10 hours. At the end of this time the excess reagent was decomposed with water. The ethereal solution was extracted with 2 N hydrochloric acid (3×200 ml.) and then washed with water and dried. Evaporation gave the neutral fraction (33 g.).

The acid solution was basified and the precipitated oil extracted with ether. The ethereal solution was dried and the ether removed. The basic fraction weighed 9.5 g.

The oily basic fraction was distilled. It boiled at 100-105° (bath temperature) 2×10⁻³ mm. It formed a thick heavy yellow resin which on standing under hexane yielded crystals. These crystals were removed by filtration and the mother liquors on concentration yielded a further crop of the same material. After recrystallization from ether-pentane it melted at 139°. The mother liquors then gave a crop of material, M. P. 79-80°. The melting point was not changed by recrystallization from pentane.

By the application of the methods of Example 4 to cases wherein the amino-ketone stage did not crystallize, dimethylamine, morpholine, pyrrolidine, methylbenzylamine and N'-ethylpiperazine were reacted with benzalcyclohexanone, the reaction mixtures were reduced with lithium aluminum hydride and the corresponding 2-(α-secondaryaminobenzyl)cyclohexanols obtained as mixtures of epimeric alcohols. The yields in the aforementioned cases were 40%, 50%, 80%, 45% and 70% respectively. Diethylamine, 2-methylpiperidine and 1,2,5-trimethylpiperazine, under the same conditions, afforded little or no water-insoluble basic material.

Similarly, m-methoxybenzalcyclohexanone and o-chlorobenzalcyclohexanone added methylpiperazine to give the corresponding 2-(α-N'-methylpiperazinobenzyl)-cyclohexanones which were reduced to the amino-alcohols.

It will be apparent to one skilled in the art that numerous variations in the above procedures are possible. For example, while use of solvent in addition of amine to benzalcyclanone offers little advantage, any indifferent solvent such as ether, benzene, toluene, or the like, but not a hydroxylic solvent, may be employed. The chief criterion should be (*a*) that it be non-hydroxylic and (*b*) that it should not react with lithium aluminum hydride. For example, ethyl acetate would be undesirable. Further, while we have employed ethyl ether in the laboratory as a solvent for the reduction stage, other ethers such as tetrahydrofurane, dioxane, dibutyl ether and the like will probably be preferred by production chemists. Such variations are obvious equivalents of our methods and are embraced in our invention.

We claim:

1. The method of preparing amino-alcohols of the formula

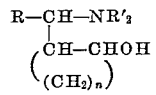

wherein R is a phenyl radical, *n* is an integer from 3 to 5 inclusive, and —NR'₂ is a secondary amino radical selected from the class consisting of the dimethyl, methyl-benzyl, piperidino, morpholino, pyrrolidino and lower N'-alkylpiperazino radicals, which comprises reacting with a benzalcyclanone of the formula

a secondary amine of the formula $HN'_2$, wherein R, R' and $n$ have the values assigned above, to form a

benzylcyclanone and reducing this amino ketone to give the desired amino-alcohol.

2. The method as set forth in claim 1 wherein reduction is effected with a complex metal hydride.

3. The method as set forth in claim 1 wherein the reduction is effected with lithium aluminum hydride.

4. An amino alcohol of the formula

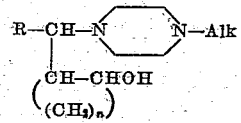

wherein R is a phenyl radical, Alk is a lower alkyl radical and $n$ is an integer from 3 to 5.

5. 2-($\alpha$-[N'-lower alkylpiperazino]) benzylcyclohexanol.

6. 2-($\alpha$-[N'-lower alkyl piperazino] benzyl) cyclopentanol.

7. 2-($\alpha$-[N'-lower alkylpiperazino] benzyl) cycloheptanol.

8. 2-($\alpha$-[N'-methylpiperazino] benzyl) cyclohexanol.

9. 2-($\alpha$-[N'-ethylpiperazino] benzyl) cyclohexanol.

10. 2-($\alpha$-[N'-methylpiperazino] benzyl) cycloheptanol.

11. 2-($\alpha$-[N'-methylpiperazino] benzyl) cyclopentanol.

No references cited.